E. M. REINER.
TEA STRAINER.
APPLICATION FILED DEC. 1, 1915.
1,182,791.
Patented May 9, 1916.
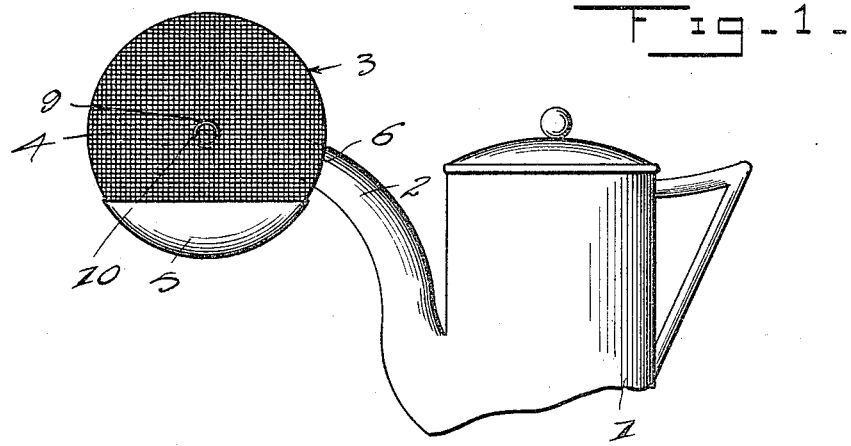
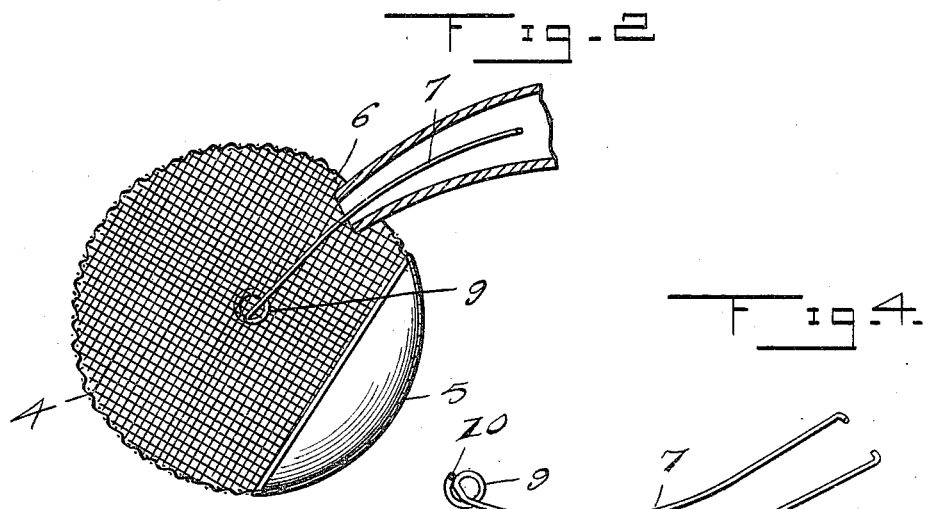
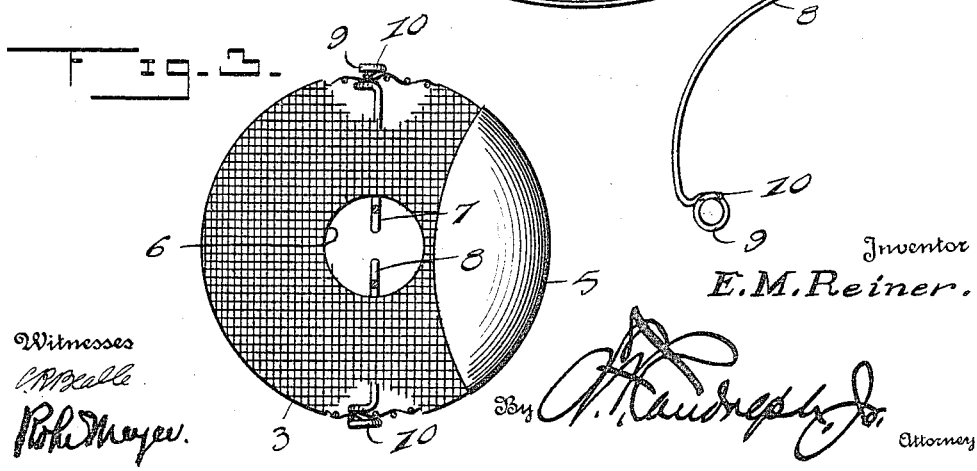
Inventor
E. M. Reiner.

UNITED STATES PATENT OFFICE.

ELIZABETH M. REINER, OF SCRANTON, PENNSYLVANIA.

TEA-STRAINER.

1,182,791.     Specification of Letters Patent.     Patented May 9, 1916.

Application filed December 1, 1915.   Serial No. 64,510.

*To all whom it may concern:*

Be it known that I, ELIZABETH M. REINER, a citizen of the United States, residing at Scranton, in the county of Lackawanna and State of Pennsylvania, have invented certain new and useful Improvements in Tea-Strainers; and I do hereby declare the following to be a full, clear, and exact description of the invention, such as will enable others skilled in the art to which it appertains to make and use the same.

This invention relates to tea strainers and the primary object of the invention is to provide a tea strainer which may be detachably connected to the spout of a tea pot, and remain stationary with respect to the spout during the pouring of tea therefrom, thereby eliminating the liability of the soiling of a table cloth or the like by the swinging of the strainer, as is ordinary in the construction of strainers now commonly in use.

A further object of this invention is to provide a tea strainer which is circular shaped in cross section and has a drip pan formed upon the bottom of the same, and to detachably connect to the foraminous strainer body, a pair of resilient arms for insertion within the spout of the tea pot for attaching the strainer to the tea pot.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a side elevation of a tea pot showing the improved strainer attached thereto. Fig. 2 is a fragmentary view of the spout of the tea pot and a sectional view through the strainer in a position during the pouring of the tea, Fig. 3 is an elevation of the tea strainer, and Fig. 4 is a detail perspective view of the resilient tine.

Referring more particularly to the drawings, 1 designates a tea pot of any desired ordinary construction, which has a spout 2. The strainer is generically indicated by the numeral 3, and it is spherical shaped, having a majority of its body constructed of foraminous material as is shown at 4. A drip pan 5 is attached to the lowermost portion of the foraminous body of the tea strainer 3 and is shaped to aline with the outer surface of the foraminous portion 4 of the body for forming a complete sphere. The drip pan 5 is constructed of tin or analogous material and it is provided for receiving the dripping from the spout 2.

The strainer body 3 has a segment cut therefrom as indicated at 6 through which the delivery end of the spout 2 projects. A pair of resilient arms or fingers 7 and 8 are provided, which have their inner ends bent outwardly and coiled as is shown at 9. The terminals 10 of the coiled end of the arms 7 and 8 are reduced with respect to the diameter of the arms and are adapted for twisting through the opening in the mesh work, of the strainer for detachably connecting the arms to the strainer body. When it is desired to attach the strainer to a tea pot as shown in Fig. 1, the arms 7 and 8 are compressed toward each other, and inserted into the mouth of the spout, after which they will spring outwardly and engage the interior of the spout 2 and hold the strainer 3 securely attached to the tea pot so that it will not swing or move independent of the tea pot, when the tea is being poured therefrom.

In reducing the invention to practice, certain minor features of construction, combination and arrangement of parts may necessitate alterations to which the patentee is entitled provided such alterations are comprehended within the scope of what is claimed.

What is claimed is:—

In a tea strainer structure, a substantially spherical body having its greater portion thereof constructed of foraminous material, a drip pan formed upon the lowermost portion of said body and constructed of sheet metal, a pair of resilient arms having their inner ends bent outwardly and twisted for insertion through certain of the openings in the mesh work portion of said body, said arms having their outer ends adapted for insertion into the mouth of a spout of a tea pot for detachably connecting a strainer to the tea pot to prevent independent movement of the strainer relative to the tea pot.

In testimony whereof I affix my signature in presence of two witnesses.

ELIZABETH M. REINER.

Witnesses:
M. R. SPELLMAN,
T. O. CONNELL.